United States Patent
Graf et al.

(10) Patent No.: US 6,497,449 B2
(45) Date of Patent: Dec. 24, 2002

(54) SURFACE MOUNT SLIDE-OUT SYSTEM

(75) Inventors: Douglas R. Graf, Sussex, WI (US); Robert H. Schneider, Beaver Dam, WI (US)

(73) Assignee: Actuant Corporation, Milwaukee, WI (US)

( * ) Notice: Subject to any disclaimer, the term of this patent is extended or adjusted under 35 U.S.C. 154(b) by 0 days.

(21) Appl. No.: 09/972,072

(22) Filed: Oct. 5, 2001

(65) Prior Publication Data

US 2002/0041104 A1 Apr. 11, 2002

Related U.S. Application Data

(60) Provisional application No. 60/239,386, filed on Oct. 11, 2000.

(51) Int. Cl.[7] .................................................. B60P 3/34
(52) U.S. Cl. .................... 296/170; 296/26.13; 5/118
(58) Field of Search ........................... 296/26.09, 170, 296/26.13, 171, 165, 173, 175, 26.08, 174; 5/118, 184, 511

(56) References Cited

U.S. PATENT DOCUMENTS

| | | | | | |
|---|---|---|---|---|---|
| 3,456,978 A | * | 7/1969 | Daniels et al. | .............. | 296/170 |
| 4,534,076 A | * | 8/1985 | Barge | .......................... | 378/209 |
| 5,758,918 A | | 6/1998 | Schneider et al. | | |
| 6,007,142 A | * | 12/1999 | Gehman et al. | ............. | 296/170 |
| 6,212,710 B1 | * | 4/2001 | Jones | .......................... | 296/170 |

OTHER PUBLICATIONS

"Quick Draw II Slideout Bed Room" (one page sell sheet) and "Quick Draw Jumbo Slide with flush floor" (one page sell sheet), dated 1997, of Quick Draw, RR3, Box 6A, Smith Center, KS 66967.

Barker Manufacturing Co., "Rollout Rack Drive", dated Jan. 6, 1994, Battle Creek, Michigan.

* cited by examiner

Primary Examiner—D. Glenn Dayoan
Assistant Examiner—Jason Morrow
(74) Attorney, Agent, or Firm—Quarles & Brady LLP

(57) ABSTRACT

A surface mount slide-out support system has rollers rotatably mounted to its side walls spaced apart and received in inwardly opening U-shaped channels of a frame. The channels have gear racks affixed to than with pinion gears meshing with die racks on a common shaft and an electric motor driving the shaft. Nylon bearings between the rails and the rollers help prevent racking.

3 Claims, 2 Drawing Sheets

SURFACE MOUNT SLIDE-OUT SYSTEM

CROSS-REFERENCE TO RELATED APPLICATION

This claims the benefit of U.S. Provisional Patent Application No. 60/239,386 filed Oct. 11, 2000.

STATEMENT CONCERNING FEDERALLY SPONSORED RESEARCH OR DEVELOPMENT

Not applicable.

FIELD OF THE INVENTION

This invention relates to slide-out support systems for recreational vehicles.

BACKGROUND OF THE INVENTION

Slide-out support systems for recreational vehicles are well known and typically include a set of rails which are slidable relative to a structure which is stationary relative to the vehicle frame. The slidable rails typically support a room of the recreational vehicle which is extended to expand the interior volume of the vehicle when it is parked, and retracted to pull in the sides of the vehicle for transport over the road.

Because space is at a premium in a recreational vehicle, slide-out systems are sometimes used to conserve and efficiently utilize the available space without actually expanding it. One such application is to the bed in a recreational vehicle. For all practical purposes, the bed is only used at night. To maximize usable space during the day, if the bed is stowed, or at least partially stowed, more space is available. The present invention is directed at a slide-out which can be mounted on the floor of a recreational vehicle to support a fixture such as a bed, so that it can be stowed for an efficient utilization of space during the day, and moved to an in-use position when it is used.

SUMMARY OF THE INVENTION

The invention therefore provides a slide-out system which can be mounted inside a recreational vehicle by fixing a base frame of the system to the floor of the vehicle. The base frame has spaced apart upstanding side plates to which are rotatably mounted rollers, preferably on the outsides of the side plates. Each side plate preferably mounts two rollers which are spaced apart in a longitudinal direction and all four rollers have their axes preferably co-planar. Each set of rollers is received in a corresponding U-shaped channel which the rollers roll on to extend or retract the channel. The channels are preferably attached to one another by opposite end members so as to make a rigid structure of the two channels and the end member. In addition, to reduce or eliminate racking of the movable structure, each channel has a rack secured to it and a gear supported by the side plates of the base frame meshes with each rack. The gears are connected by a rigid shaft so that they must turn together, so that the two rails must extend and retract together. The shaft connecting the two gears is preferably driven by an electric motor and gear box drive.

The invention therefor provides a slide-out system which is easy to apply inside a recreational vehicle to conserve space and to operate, and which has sufficient structural integrity to be useful to support items such as a bed.

These and other objects and advantages of the invention will be apparent from the detailed description and drawings.

DETAILED DESCRIPTION OF THE PREFERRED EMBODIMENT

Figure 1:
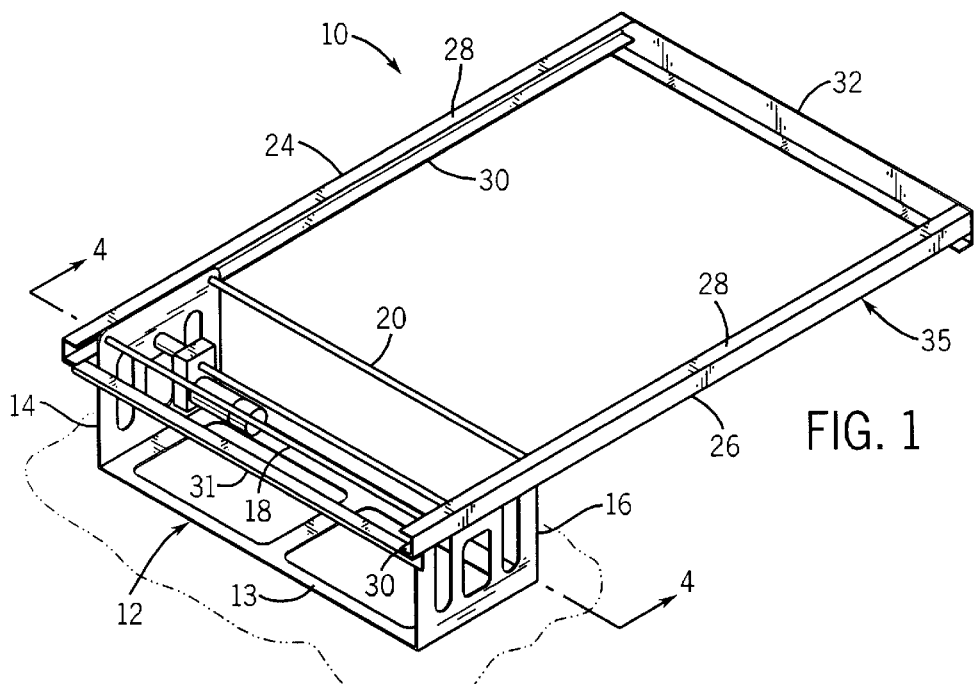
FIG. 1 is a perspective view of a slide-out support system of the invention.

Referring to FIG. 1, a surface mount slide-out support system 10 of the invention includes a laterally extending base frame 12 made of heavy gauge sheet metal which has upstanding laterally spaced sides 14 and 16 and base 13, the bottom of the base 13 providing a surface interface plane which is coplanar with the top surface of the floor F of the RV. The frame 12 has openings cut out in it to reduce its weight. Rods 18 and 20 span the sides 14 and 16 in a common horizontal plane and are longitudinally spaced apart and welded to the inside surfaces of the plates 14 and 16, so as to maintain the spacing of the plates 14 and 16. The rods 18 and 20 extend through the sides 14 and 16 and mount at each of their opposite ends a roller 22, for example a roller bearing, which is held on the rod 18 or 20 by any suitable means, such as a spring clip, set screw, etc. Therefore, each of the side plates 14 and 16 mounts on its outer side a rotatable roller 22, and the two rollers 22 on each of the plates 14 and 16 are longitudinally spaced apart with all four rollers in the same horizontal plane, parallel with the base 13 and floor F of the RV.

The two rollers 22 on each side are received within a U-shaped channel 24 on the left side (as viewed in FIG. 1) and an identical U-shaped channel 26 on the right side. The open side of each of the channels 24 and 26 faces inwardly so that the rollers 22 roll on either the top wall 28 or the bottom wall 30 of each of the channels 24 and 26. The extended end of the channels 24 and 26 are connected by end pieces 31, 32 which are welded to the ends of the channels 24,26. The end pieces may be of any suitable rigid shape and material, their functions being to maintain the spacing and orientation of the side channels 24 and 26.

Figure 2:
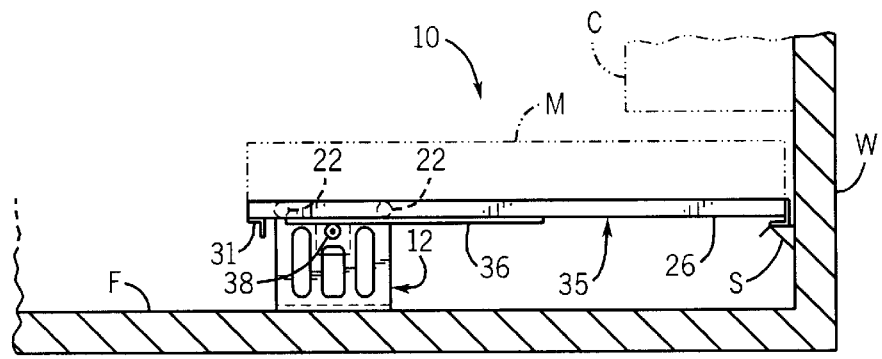
FIG. 2 is a side view of the system of FIG. 1 shown mounted in a recreational vehicle with the floor and wall of the recreational vehicle in section and shown supporting a bed (in phantom) in an extended position in which the bed is partially stowed under a wall mounted cabinet (in phantom)
Figure 3:
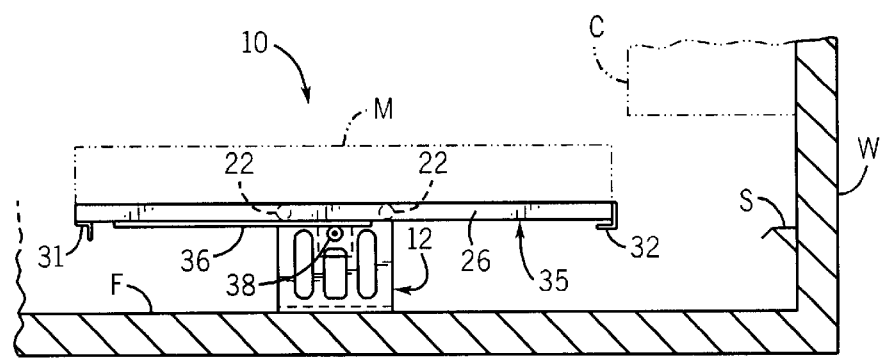
FIG. 3 is a view like FIG. 2 but with the slide-out system extended so that the bed is ready for use.
Figure 4:
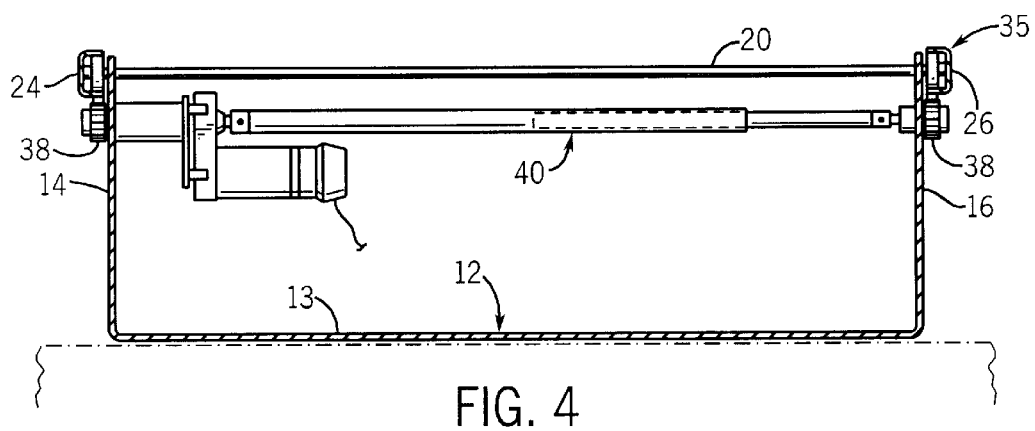
FIG. 4 is a sectional view from the plane of the line 4—4 of FIG. 1.

Thus, the channels 24 and 26 and end pieces 31 32 make a rectangular bed frame type structure 35 to support a mattress M as illustrated in phantom in FIGS. 2 and 3. The base 13 of the frame 12 is bolted or otherwise affixed to the floor F of the recreational vehicle, using, for example, wood screws or other suitable fasteners. A cabinet C or other fixture is fixed to the wall W of the recreational vehicle above the floor F a sufficient distance so that the mattress M will fit beneath it in the retracted position as shown in FIGS. 1 and 2.

Figure 5:
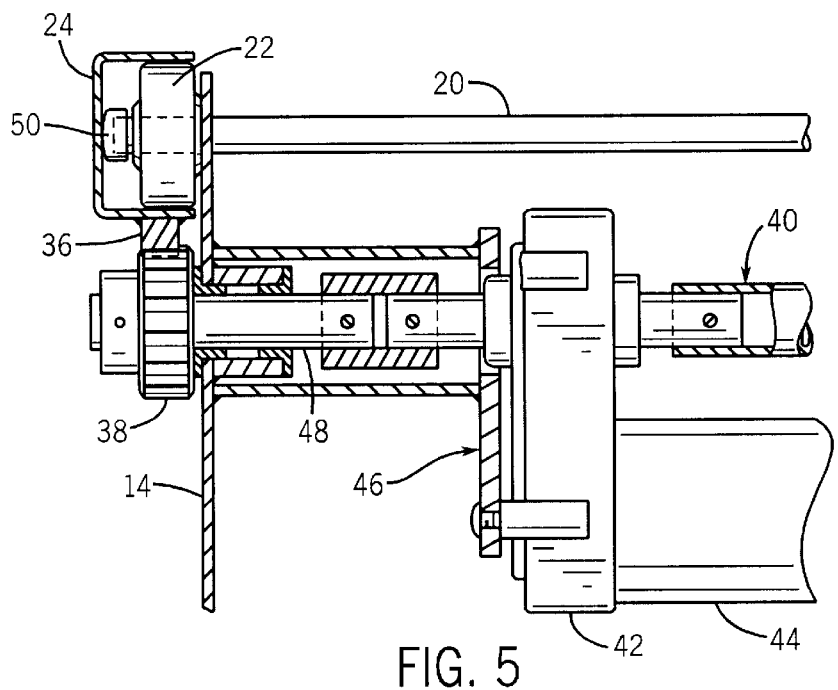
FIG. 5 is a detail sectional view illustrating aspects of the drive on the left hand side of FIG. 4.
Figure 6:
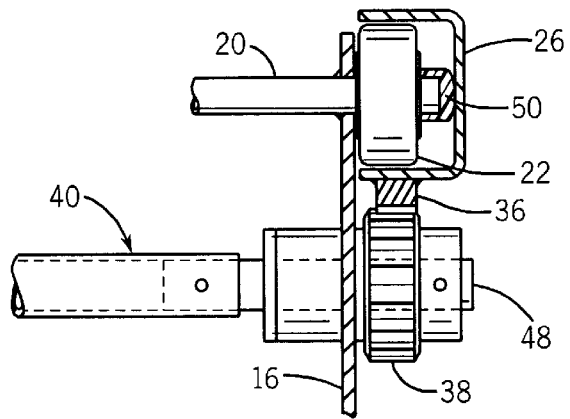
FIG. 6 is a detail sectional view illustrating aspects of the drive on the right hand side of FIG. 4.

The bottom wall 30 of each of the rails 24 and 26 has welded to its bottom side a gear rack 36 (FIGS. 5 and 6) and each gear rack 36 meshes with a pinion gear 38, one of the gears 38 being at each end of shaft 40. Shaft 40 is made in sections which can be pinned or otherwise coupled together so that its length may be easily varied. Shaft 40 extends through gear box 42 which engages the shaft, for example with a square drive connection, to drive it in one direction or the other under power from electric motor 44. A bracket 46 is welded to wall 14 to support the gear box 42 and motor 44 assembly.

At each end, shaft 40 includes stub shafts 48 which are journaled to the respective side walls 14 and 16 and have gears 38 pinned to their extending ends. Other means of moving the frame 35 relative to the frame 12 could also be used, for example hydraulic or pneumatic cylinders or rotary motors, or cable, chain or belt driven systems.

Nylon bearings 50 are snapped or otherwise fitted over the ends of the shafts 18 and 20 to bear against the inner side walls of the rails 24 and 26 when the frame 35 tends to rack in a horizontal plane relative to the frame 12.

FIG. 3 shows the extended position of the assembly 10. In the retracted position of FIG. 2, the gears 38 are in engagement with the racks 36 near one end of the racks 36, with the frame 35 extending to one side of the base frame 12 and the base frame 12 at one end of the rails 24 and 26. The mattress extends under the cabinet C to conserve space. One or more supports S having an angled front lead-in edge may be provided on the wall W to help hold up the extended end of the frame 35 in the retracted position. In the extended position of FIG. 3, the gears 38 are in engagement with the racks 36 at the opposite end of the racks 36. In this position, the frame 12 is roughly centered relative to the length of the rails 24 and 26, with each of the rollers 22 an approximately equal distance from the closest end of the rails 24 and 26. In this position, the mattress M is ready for use.

A preferred embodiment of the invention has been described in considerable detail. Many modifications and variations will be apparent to those of ordinary skill in the art. Therefore, the invention should not be limited to the embodiment described, but should be defined by the claims which follow.

We claim:

1. A surface mount slide-out support system including:
   a base frame having a base with a surface interface plane mountable against a surface and laterally spaced apart upstanding side walls generally perpendicular to said surface interface plane at opposite sides of said base;
   rollers rotatably mounted to the side walls to rotate about rotational axes which are in a common plane that is parallel to said surface interface plane and are parallel, at least two rollers having parallel axes in said common plane being mounted to each side wall with their axes longitudinally spaced apart;
   a movable frame including a pair of U-shaped rails, one of said rails adjacent to each said side wall and having its open side facing inwardly toward said side wall, said rollers mounted to said adjacent side wall being received in the adjacent rail;
   means for moving said movable frame relative to said base frame so that said rollers roll on upper or lower walls of said rails; and
   sliding bearings, between a side wall of each of said rails and said rollers, which rub on said side wall to prevent angling of said rails relative to said base frame in a plane defined by said rails.

2. A surface mount slide-out support system including:
   a base frame having a base with a surface interface plane mountable against a surface and laterally spaced apart upstanding side walls generally perpendicular to said surface interface plane at opposite sides of said base;
   rollers rotatably mounted to the side walls to rotate about rotational axes which are in a common plane that is parallel to said surface interface plane and are parallel, at least two rollers having parallel axes in said common plane being mounted to each side wall with their axes longitudinally spaced apart;
   a movable frame including a pair of U-shaped rails, one of said rails adjacent to each said side wall and having its open side facing inwardly toward said side wall, said rollers mounted to said adjacent side wall being received in the adjacent rail;
   means for moving said movable frame relative to said base frame so that said rollers roll on upper or lower walls of said rails; and
   a gear rack mounted to each said rail and a pair of gears, one of said gears meshing with each of said racks and wherein said gears are connected by a common shaft so that said gears rotate together.

3. A slide-out support system as claimed in claim 2, wherein said gears are rotated by an electric motor.

* * * * *